F. VOGELZANG.
FLYING MACHINE.
APPLICATION FILED JUNE 1, 1920.

1,353,501.

Patented Sept. 21, 1920.
5 SHEETS—SHEET 1.

Inventor
Frank Vogelzang
By W. W. Williamson
Atty.

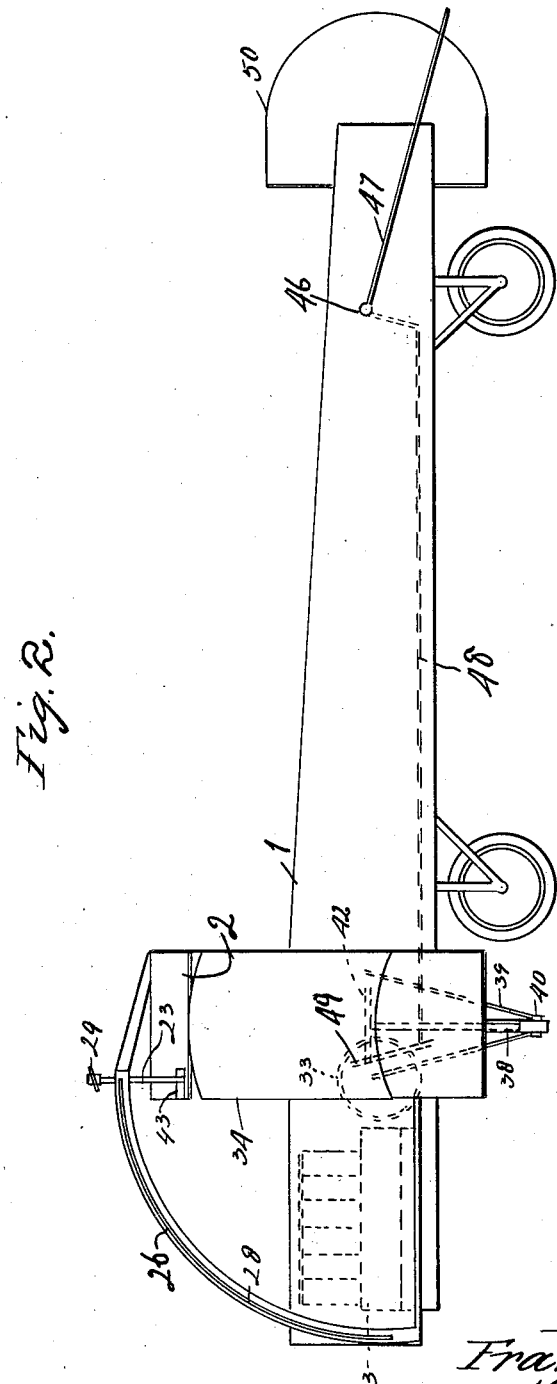

F. VOGELZANG.
FLYING MACHINE.
APPLICATION FILED JUNE 1, 1920.
1,353,501.
Patented Sept. 21, 1920.
5 SHEETS—SHEET 3.
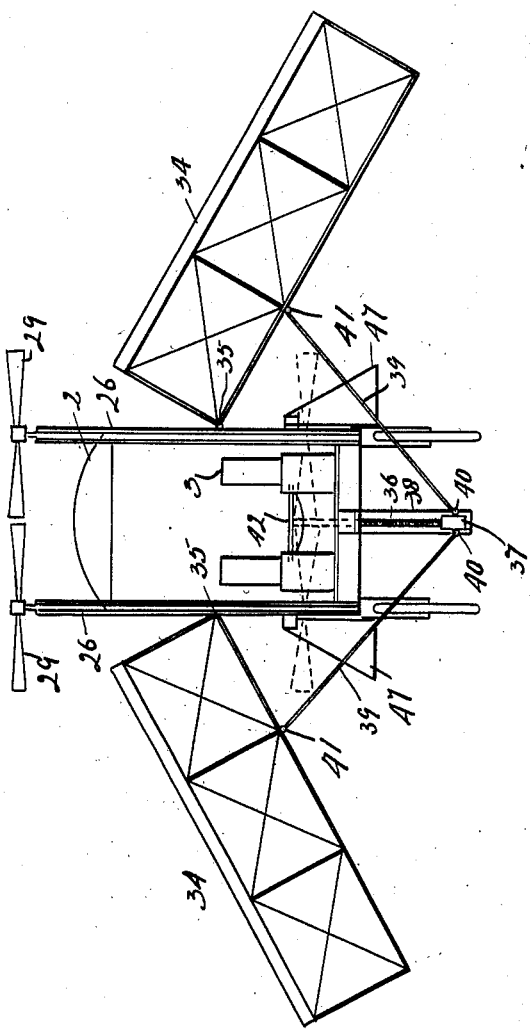

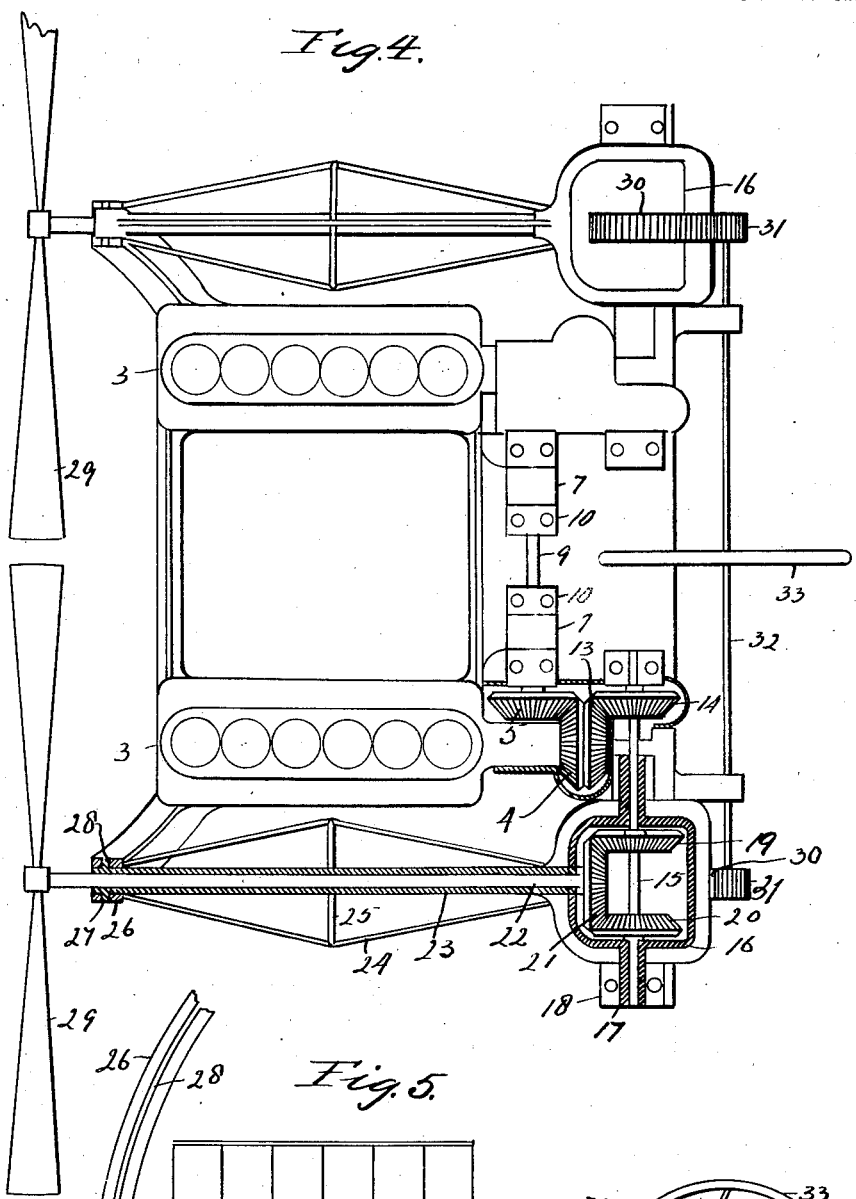

F. VOGELZANG.
FLYING MACHINE.
APPLICATION FILED JUNE 1, 1920.

1,353,501.

Patented Sept. 21, 1920.
5 SHEETS—SHEET 5.

Inventor
Frank Vogelzang
By W. W. Williamson
Atty.

UNITED STATES PATENT OFFICE.

FRANK VOGELZANG, OF ROCK VALLEY, IOWA.

FLYING-MACHINE.

1,353,501.　　　　　Specification of Letters Patent.　　Patented Sept. 21, 1920.

Application filed June 1, 1920. Serial No. 385,524.

*To all whom it may concern:*

Be it known that I, FRANK VOGELZANG, a citizen of the United States, residing at Rock Valley, in the county of Sioux and State of Iowa, have invented new and useful Improvements in Flying-Machines, of which the following is a specification.

My invention relates to a new and useful improvement in flying machines and has for its primary object to so construct a flying machine as to provide for the adjustment of the propellers in such manner as to permit the lifting of the machine substantially vertically from the ground and then by readjusting the propellers give said machine a forward movement.

A further object of my invention is to provide for the attachment of the wings or planes to the flying machine in such manner that they may be adjusted in unison at various angles to the body of the machine.

A still further object of my invention is to provide simple and effective mechanism for bringing about the various adjustments and operations of the machine, the action of said mechanisms being under the easy control of the operator.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 2, is a side elevation of the machine.

Fig. 3, is a front view.

Fig. 4, is an enlarged plan view of the motors, propellers and mechanisms for connecting, adjusting and operating the latter, portions being sectioned away to more clearly show the operating mechanism.

Fig. 5, is a side elevation of Fig. 4.

Figure 1:
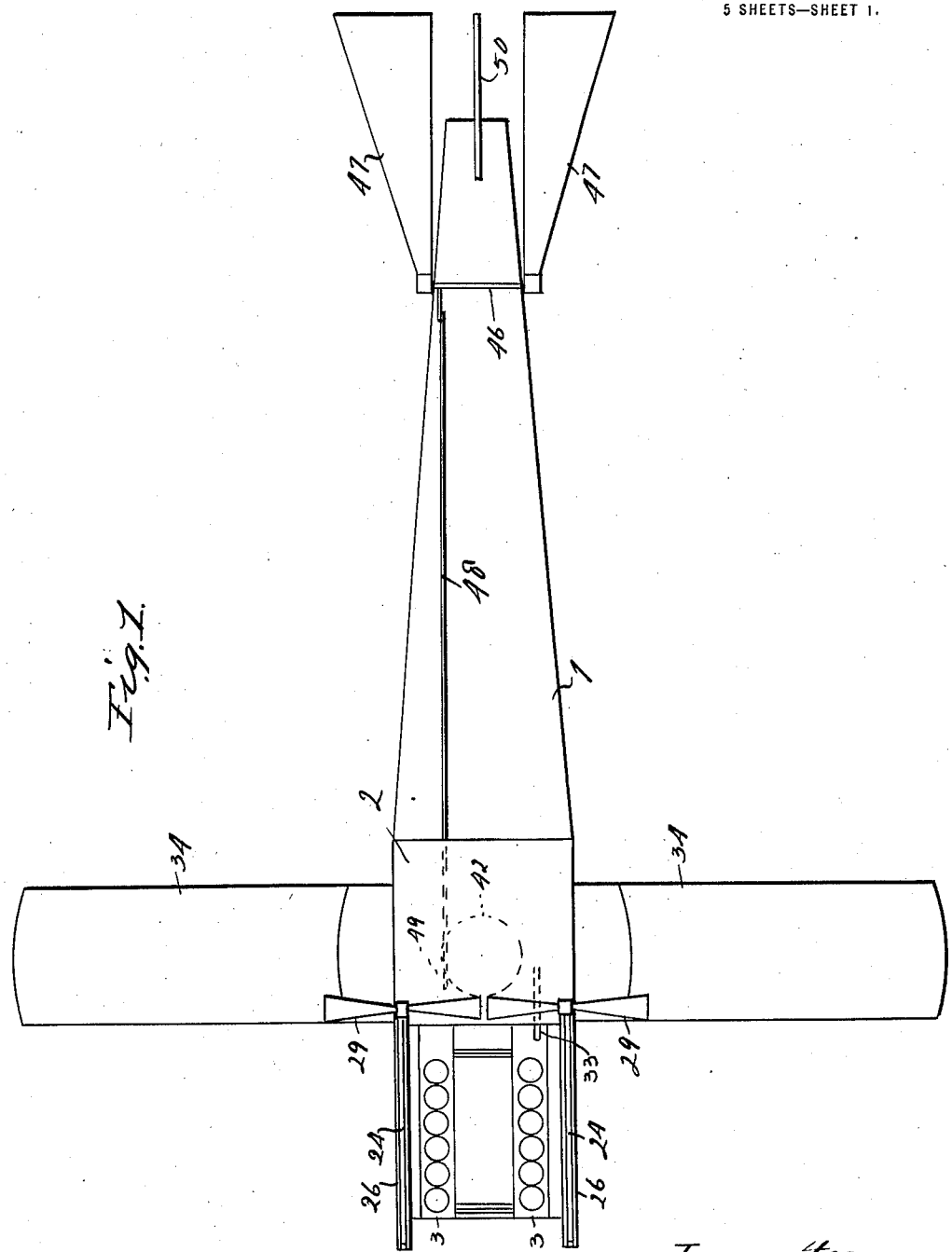
Figure 1, is a plan view of my improved flying machine.
Figure 6:
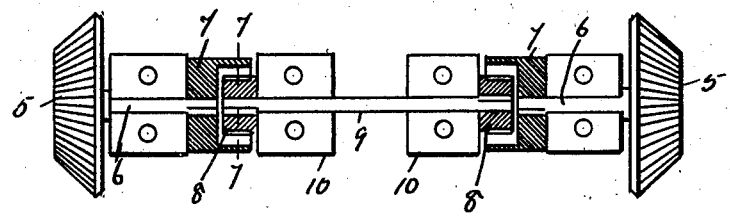
Fig. 6, is an enlarged detail view of the mechanism for coupling the two motors together partially in section to show the interior construction of the clutch.
Figure 7:
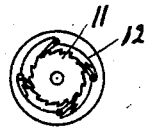
Fig. 7, is a section on the line 7—7 of Fig. 6.
Figure 8:
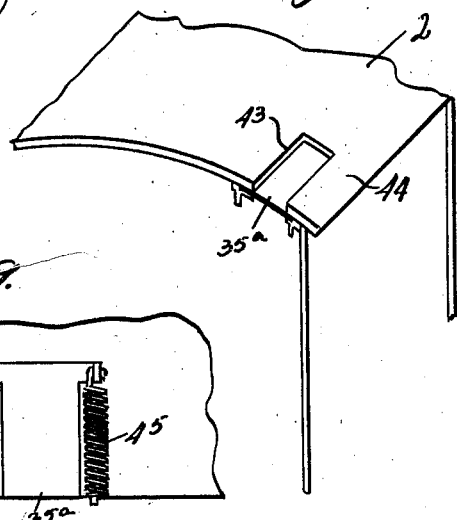
Fig. 8, is a detail perspective of a portion of the hood showing one of the sliding trap doors for the accommodation of the propeller shafts when the latter are swung to a vertical position.
Figure 9:
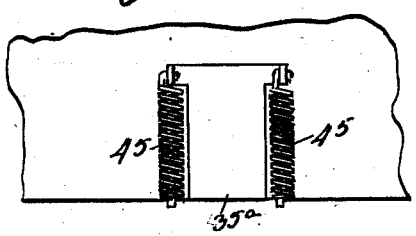
Fig. 9, is an enlarged bottom plan view of one of the trap doors.

In carrying out my invention as here embodied, 1 represents the body of the machine carrying the hood or aviator's inclosure 2 and upon the forward portion of the body is located the engines 3 here shown as two in number, and the power shaft of each of these engines has secured thereon a bevel gear 4, and each of these bevel gears meshes with a corresponding bevel gear 5 secured upon the outer end of a short shaft 6, said short shafts carrying the female clutch members 7 into which fit the male members 8 of said clutches. The clutch members 8 are secured upon the outer ends of the coupling shaft 9 journaled in suitable bearings 10 and the members of the clutches are connected together by the ratchet wheels 11 and pawls 12 so as to permit the engines to act in unison.

The power shafts of the engines also have secured thereon the bevel gears 13 or these gears may be formed with the bevel gears 4, each of the bevel gears 13 meshing with a bevel gear 14 which latter is secured upon the countershaft 15.

16 represent two gear boxes each of which is journaled on the trunnions 17 fitted in the bearings 18 supported upon the frame of the machine, and one of the countershafts 15 passes through each of the gear boxes and has secured thereon the bevel gear 19 and loosely mounted thereon the bevel gear 20 both of which said gears mesh with a bevel gear 21 secured on the inner end of the propeller shaft 22.

The propeller shaft 22 is journaled in the casing 23 which latter is braced by the rods 24 and cross bar 25, and the outer end of the casing 23 is fitted to slide in the segment 26 the studs 27 projecting from the casing into the slots 28 formed in the segment so as to properly guide this outer end of the casing.

29 represent the propellers, one of which is secured to the outer end of each of the shafts 22.

The segment 26 being secured at each end to the frame of the machine so that the center of the circle of which it forms a part coincides with the center of the trunnions 17, the propeller shaft casing may be swung from a horizontal position to a vertical position as clearly shown. While this may be effected in any convenient manner the mechanism I have here shown for accomplishing this result consists of a segmental gear 30 formed around a portion of each of the gear boxes 16 and having the pinions 31 meshing therewith, said pinions being secured upon the outer ends of the operating shaft 32 which latter carries the hand wheel 33 in easy reach of the aviator. By the operation of this hand wheel the propellers may be swung to any position from a horizontal to a vertical or stopped at any intervening point without interfering with the rotation of the propellers by the engines as will be readily understood.

34 represent the wings which may be of any desired construction of either the single plane or double plane type, said wings being hinged to the frame of the machine as indicated at 35 so that they may be swung from a horizontal position downward to a considerable angle, and if found desirable may be arranged to be swung upward at an angle above the horizontal. In order that these wings may be readily controlled by the aviator and set at any desired angle in unison, I provide an operating screw rod 36 in which runs the nut 37 the latter being guided in the frame 38, and to this nut is pivoted the rod 39, at 40 their upper ends being pivoted at 41 to the underside of the wings, while upon the upper end of the screw rod 36 is secured a hand wheel 42 in easy reach of the aviator. From this it will be seen that when the wheel 42 is properly manipulated the nut 37 will be raised or lowered and consequently the wings will also be raised or lowered in unison.

In order that the propeller shafts may be brought to a true vertical position, I provide cutaway portions 43 in the top 44 of the aviator inclosure and arrange the trap doors 35ª so that they will slide back and forth to close these openings, and in order that these trap doors may automatically close when the propeller shafts are swung out of the openings coil springs 45 are attached to said doors in such manner as to normally hold them in their closed positions yet permitting them to be forced backward by the propeller shafts from the latter coming in contact therewith.

In the rear portion of the body of the machine is journaled a short shaft 46 upon the outer ends of which are secured the vanes or rudder planes 47 for directing the up and down course of the machine, and these planes are connected by the rod 48 to an operating lever 49 in easy reach of the aviator, and 50 represents the usual plane or rudder for steering the machine sidewise and may be connected in the usual manner to a lever in easy reach of the aviator.

From the foregoing description the operation of my improved flying machine will be obviously as follows:—

Where it is necessary or desirable at the beginning of a flight to raise the machine directly upward the propeller shafts are adjusted to a vertical position so that when the engines are put in operation the revolving of these propellers will lift the machine substantially in a vertical line and after the desired height has been reached the propeller shafts are gradually swung downward until reaching a position for giving the machine the proper forward motion. As the propeller shafts may be set at various angles relative to the machine a more or less upward pull upon the machine may be had during its flight forward thus causing the propellers to assist the wings in lifting the load, and this is of great importance where the machine strikes what is known as air pockets which would have a tendency to cause the machine to take a head on dive since the propellers may be swung upward to a degree sufficient to lift the nose of the machine thereby preventing serious accidents which often occur from this cause. Another advantage in having the propellers adjustable to different positions is that when alighting far better control may be had by the aviator since the forward wheels of the machine may be brought in contact with the ground with less violence and when necessary lifted over serious obstructions.

When the machine is lifted vertically as before described the vanes or planes 47 may be swung downward until they reach a vertical position, thus relieving the wind pressure upon the rear of the machine caused by its upward movement or these planes may be set at such an angle as will balance the superior weight of the engines.

The adjustability of the wings provides for various conditions met in the flight of the machine and especially in descending as by setting the wings at a considerable angle to the body of the machine the general effect of a parachute is obtained.

Of course I do not wish to be limited to the exact details of construction as herein shown as these may be varied within the limits of the appended claims without departing from the spirit of my invention.

Having thus fully described my invention, what I claim as new and useful is:—

1. In a flying machine of the character described, engines mounted upon the machine, countershafts, bevel gears for transmitting power from the engines to the countershafts, gear boxes through which said countershafts extend, trunnions upon which the gear boxes are journaled so as to have a swinging movement, bevel gears mounted upon the countershafts, propeller shafts, a bevel gear carried upon the inner end of each propeller shaft meshing with the gears upon the countershafts, casings carried by the gear boxes through which said propeller shafts extend, segments in which the outer ends of the casings are guided, and means for swinging the casing and propeller shafts carried thereby from a horizontal to a vertical position.

2. In a flying machine, a body, a pair of engines mounted upon the forward portion of said body, swinging gear boxes, countershafts passing through the axis of said gear boxes, means for transmitting power from the engines to the countershafts, casings projecting from the gear boxes, propeller shafts journaled in said casings, means for transmitting power from the countershafts to the propeller shafts, and means for swinging the casing and propeller shafts carried thereby to different angles relative to the body of the machine.

3. In a flying machine, a body, a pair of engines mounted upon the forward portion of said body, swinging gear boxes, countershafts passing through the axis of said gear boxes, means for transmitting power from the engines to the countershafts, casings projecting from the gear boxes, propeller shafts journaled in said casings, means for transmitting power from the countershafts to the propeller shafts, means for swinging the casing and propeller shafts carried thereby to different angles relative to the body of the machine, wings hinged to the body, and means for adjusting said wings at various angles to said body.

4. In a flying machine, a body, swinging gear boxes mounted upon said body, segmental gears carried by the gear boxes, pinions meshing with said segmental gears, a shaft upon which said pinions are mounted, means for manually revolving said shaft, propeller shafts carried by the gear boxes, and means for revolving said propeller shafts.

5. In combination with a flying machine of the character described, gear boxes having trunnions formed therewith, said trunnions being fitted in suitable bearings, countershafts extending through said trunnions, gear boxes, a fast and loose bevel gear mounted upon each of the countershafts within the gear boxes, a casing projecting from each of the gear boxes, a propeller shaft journaled in each of said casings, a bevel gear secured to the inner end of each of said propeller shafts, said last named gear meshing with the fast and loose bevel gears, means for transmitting power to the countershafts and means for swinging the gear boxes in unison for changing the positions of the propeller shafts relative to the body of the machine.

6. In a flying machine the combination of a body, segmental guides supported by said body, swinging casings having their outer ends fitted to slide in the segmental guides, propeller shafts journaled within said casings, propellers carried by the outer ends of said shafts, means for swinging the casings and propeller shafts carried thereby to different angles relative to the body of the machine, engines located upon the body, means for transmitting power from the engines to the propeller shaft, wings hinged to the body so as to be set at different angles thereto, a screw rod, a nut threaded upon said rod, a connecting rod pivoted to said nut and the wings, and a hand wheel mounted upon a screw rod for revolving the latter whereby the nut may be raised or lowered for adjusting the wings.

7. In combination with a flying machine, two swinging propeller shafts, propellers carried upon the outer ends of said shafts, means for swinging said shafts to various angles relative to the machine, an inclosure having cutaway portions in the top thereof, and spring actuated trap doors arranged to permit the propeller shafts to pass within said cutaway portions and close the latter when the shafts are swung therefrom.

8. In a flying machine, a body, wings hinged to said body, a threaded operating rod, a hand wheel mounted upon the upper end of said rod, a nut threaded upon the lower portion of said rod, means for guiding said nut and rod pivoted to said nut, and wings whereby the raising and lowering of the nut will raise and lower the wings.

In testimony whereof, I have hereunto affixed my signature.

FRANK VOGELZANG.